(12) United States Patent
Moller (10) Patent No.: US 9,713,034 B2
(45) Date of Patent: Jul. 18, 2017

(54) MULTI-LINK SCHEDULING TO COMPENSATE FOR MULTI-PATH FADING

(75) Inventor: Karl-Magnus Moller, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 326 days.

(21) Appl. No.: 13/505,364

(22) PCT Filed: Nov. 3, 2009

(86) PCT No.: PCT/EP2009/064507
§ 371 (c)(1),
(2), (4) Date: May 1, 2012

(87) PCT Pub. No.: WO2011/054370
PCT Pub. Date: May 12, 2011

(65) Prior Publication Data
US 2012/0218912 A1    Aug. 30, 2012

(51) Int. Cl.
*H04W 28/08* (2009.01)
*H04W 40/12* (2009.01)
(Continued)

(52) U.S. Cl.
CPC .......... *H04W 28/08* (2013.01); *H04W 40/12* (2013.01); *H04L 47/14* (2013.01); *H04W 24/00* (2013.01);
(Continued)

(58) Field of Classification Search
CPC ..... H04L 47/50; H04L 49/3027; H04L 49/90; H04L 47/12; H04L 47/125; H04L 47/127;
(Continued)

(56) References Cited

U.S. PATENT DOCUMENTS 5,414,414 A * 5/1995 Suzuki ............... H04B 1/74
340/2.1
5,657,315 A * 8/1997 Waclawsky et al. ......... 370/452
(Continued)

FOREIGN PATENT DOCUMENTS

EP    1156609 A1    11/2001

OTHER PUBLICATIONS

Office Action dated Apr. 16, 2014, issued in Chinese Patent Application No. 200980162283.7, 11 pages.

*Primary Examiner* — Charles C Jiang
*Assistant Examiner* — Oussama Roudani
(74) *Attorney, Agent, or Firm* — Rothwell, Figg, Ernst & Manbeck, P.C.

(57) ABSTRACT

The present solution relates to a method in a first communication node for (101) improving bandwidth utilization in a wireless communication system (100). The system comprises at least two communication links (110, 112) between the first communication node (101) and a second communication node (105). First, the first node (101) receives (501) data. Then, it indicates (502) that the data belongs to a category relating to link quality. The number of categories is related (503) to the number of communication links. Link quality based on communication link quality measurements of the at least two communication links (110, 112) is then determined (504), before the data is sent (509) on one of the at least two communication links (110, 112) to the second communication node (105). The chosen link being based on the quality measurements.

24 Claims, 6 Drawing Sheets

(51) Int. Cl.
  *H04L 12/801* (2013.01)
  *H04W 24/00* (2009.01)
  *H04W 72/12* (2009.01)
  *H04W 88/08* (2009.01)

(52) U.S. Cl.
  CPC ........ *H04W 72/1231* (2013.01); *H04W 88/08* (2013.01)

(58) Field of Classification Search
  CPC ............. H04L 49/9036; H04L 49/9026; H04L 49/9047; H04L 49/9052; H04L 49/9057; H04L 67/1097; H04L 69/12; H04L 69/16; H04L 69/161; H04L 69/32; H04L 29/06; H04L 67/34; H04L 69/10; H04L 69/163; H04L 69/165; H04L 69/166; H04L 69/18; H04L 69/329
  USPC ....... 370/216, 229–235, 328, 334, 442, 337, 370/400, 452.1, 452.2, 509, 512, 513, 370/331, 389, 252, 329, 338, 312, 238; 709/212, 217, 227, 230, 238, 250
  See application file for complete search history.

(56) References Cited

U.S. PATENT DOCUMENTS

| | | | |
|---|---|---|---|
| 5,752,192 A * | 5/1998 | Hamabe | 455/450 |
| 7,263,065 B1 * | 8/2007 | Cahn | H04L 12/5693 370/235 |
| 7,936,770 B1 * | 5/2011 | Frattura et al. | 370/412 |
| 8,144,589 B2 * | 3/2012 | Meylan et al. | 370/235 |
| 2003/0005144 A1 * | 1/2003 | Engel et al. | 709/235 |
| 2004/0174865 A1 * | 9/2004 | O'Neill | 370/352 |
| 2006/0268749 A1 * | 11/2006 | Rahman et al. | 370/256 |
| 2008/0095055 A1 * | 4/2008 | Moulsley et al. | 370/234 |
| 2008/0186989 A1 * | 8/2008 | Kim | 370/412 |
| 2008/0291826 A1 * | 11/2008 | Licardie et al. | 370/230 |
| 2009/0003282 A1 | 1/2009 | Meylan et al. | |
| 2009/0086664 A1 | 4/2009 | Wu | |

* cited by examiner

MULTI-LINK SCHEDULING TO COMPENSATE FOR MULTI-PATH FADING

CROSS REFERENCE TO RELATED APPLICATION(S)

This application is a 35 U.S.C. §371 National Phase Entry Application from PCT/EP2009/064507, filed Nov. 3, 2009, designating the United States, the disclosure of which is incorporated herein in its entirety by reference.

TECHNICAL FIELD

This invention relates generally to a method in a communication node, a communication node and a wireless communication system. More particularly this invention relates to improving bandwidth utilization in a wireless communication system.

BACKGROUND

In wireless communication systems, multi-path fading may be described as very quick fading conditions that may cause bit errors leading which might lead to discarded frames/packet drop. For highly loss sensitive data such as for example High Definition Television (HDTV) streams etc., this may cause very noticeable service degradation for the end user. Fading is related to attenuation of the signal. Examples of different types of fading may be:
  1. Rain fading (fairly slow attenuation envelope).
  2. Defocusing and ducting (long events, fairly fast envelope).
  3. Multi-path propagation fading (very fast envelope and quick events).

Protection against multi-path fading is most often performed by using two different antennas mounted a distance apart, e.g. a few meters apart. If the calculation of the distance between the two antennas has been performed correctly, at least one of the antennas will have a good signal during multi-path fading conditions.

For Plesiosynchronous Digital Hierarchy (PDH)/Time Division Multiplexing (TDM) based traffic, protection against multi-path fading has traditionally been performed by configuring the radios attached to the antennas in 1+1 configuration (two transmitters sending the same data) with one receiver active and the other passive and the receiver switched channel depending on which radio who had the best signal quality.

When native packet based data was introduced in the microwave radio link domain, it became possible to perform a layer one (L1) segmentation of the data stream to provide 2+0 protection schemes, or n+0, in case of more radios. A 2+0 protection scheme implies that there are two active transmitters. In case one of the received data streams have errors (link goes down), the capacity will be reduced by one link. This configuration provided at least twice the bandwidth utilization, since the data did not have to be sent on both channels simultaneously.

In case of multi-path fading scenarios, one of the radios channels in the 2+0 pair will start to receive bit errors due to fading. Since data is shared over the two links instead of being duplicated (as for 1+1), packet drop that is not control by Quality of Service (QoS) mechanisms will occur.

Existing QoS mechanisms may provide quality feedback to the transmitter. Quality feedback may be provided in several ways, for example in case that the radio support the feature Automatic Transmission Power Control (ATPC), the receiver will continuously be provided with information of the signal strength from the corresponding receiver on the other side of the hop. Another example may be in case that the radio supports adaptive modulation, where quality information is sent from the receiver on the other side of the hop to the transmitting modem in order to adjust its modulation scheme according to the received signal quality.

The existing solutions have several drawbacks:
1+1: Poor bandwidth utilization (50%). Good protection of high priority data.
2+0: Good bandwidth utilization (up to 100%), but poor protection of high priority data against multi-path fading.
1+½+0: Good bandwidth utilization for low priority data (100%), poor utilization for high priority data (50%), but good protection against packet drop of high priority data during multi-path fading.

SUMMARY

It is thus an object of the present invention to provide a method for improved bandwidth utilization in a wireless communication system.

According to a first aspect of the present solution, the objective is achieved by a method in a first communication node for improving bandwidth utilization in a wireless communication system. The system comprises at least two communication links between the first communication node and a second communication node. The first step of the method is to receive data. Then, it is indicated that the data belongs to a category relating to link quality. The number of categories is related to the number of communication links. The next step is to determine link quality based on communication link quality measurements of the at least two communication links, before the data is sent on one of the at least two communication links to the second communication node, the link being chosen based on the received quality measurements.

According to a second aspect of the present solution, the objective is achieved by a first communication node in a wireless communication system for improving bandwidth utilization. The system comprises at least two communication links between the first communication node and a second communication node. The first communication node comprises a receiver arranged to receive data. The node also comprises a scheduler arranged to indicate that the data belongs to a category relating to link quality and arranged to relate the number of categories to the number of communication links. A quality evaluator is comprised in the node and arranged to determine link quality based on communication link quality measurements of the at least two communication links. Further, the first communication node comprises a transmitter arranged to transmit the data on one of the at least two communication links to the second communication node, the link being chosen based on the received quality measurements.

According to a third aspect of the present solution, the objective is achieved by a wireless communication system for improving bandwidth utilization. The system comprises at least two communication links between a first communication node and a second communication node. The first communication node is arranged to receive data and to indicate that the data belongs to a category relating to link quality. The first node is further arranged to relate the number of categories to the number of communication links, to determine link quality based on communication link quality measurements of the at least two communication links, and to transmit the data on one of the at least two communication links to the second communication node, the link chosen being based on the received quality measurements. The second communication node is arranged to receive the transmitted data, to assemble the transmitted data, and to transmit the assembled data to a receiver.

Thanks to relating data to link quality and using measurements of communication link quality, data is categorized as very sensitive to packet loss and bit errors. Thus, it may be ensured that loss sensitive data is being sent on a microwave radio link that has the best quality during fading conditions in order to minimize packet loss for this type of traffic and at the same time ensure high link utilization, which improves bandwidth utilization.

The present technology affords many advantages, for which a non-exhaustive list of examples follows.

An advantage of the present solution is that almost the full bandwidth may be utilized while still being able to guarantee low bit error rate/packet drop for high priority, loss sensitive data. The present solution is simple, and the mechanism may to a large extent be implemented in current modems and radios by means of Field Programmable Gate Array (FPGA) updates or by software. By rerouting each applicable datagram after the modem buffer stage, the response time to fading may be made very fast. Another advantage is that the delay variation caused by the difference in bandwidth may be compensated in order to provide low Packet Delay Variation (PDV) for highly jitter sensitive data.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the solution and in which.

DETAILED DESCRIPTION

The concept of the present solution ensures that loss sensitive data and high priority data is being sent on a wireless communication link, e.g. a microwave radio link, which has the best quality during fading conditions in order to minimize packet loss for this type of traffic and at the same time ensure high link utilization in a packet based wireless communication system. Highly loss sensitive data may for example be High Definition Television (HDTV) streams etc, where fading may cause very noticeable service degradation for the end user. The quality of the communication channel where low priority or data which are not sensitive to loss are sent is not so critical.

The present solution is based on that multiple microwave radio links are used in parallel in order to provide protection against multi-path fading. In other words, the quality feedback information is sent to a selection mechanism that controls the traffic separation, i.e. which type of data that is being sent on which radio channel. Traffic separation may be performed by using regular mechanisms such as parity (P)-bits, Differentiated Services Code Point (DSCP) and Type of Service (TOS) values in case of Ethernet and Internet Protocol (IP) datagrams. The signal quality feedback signal is fed to a quality evaluator which provides information to a packet forwarding mechanism.

Figure 1:
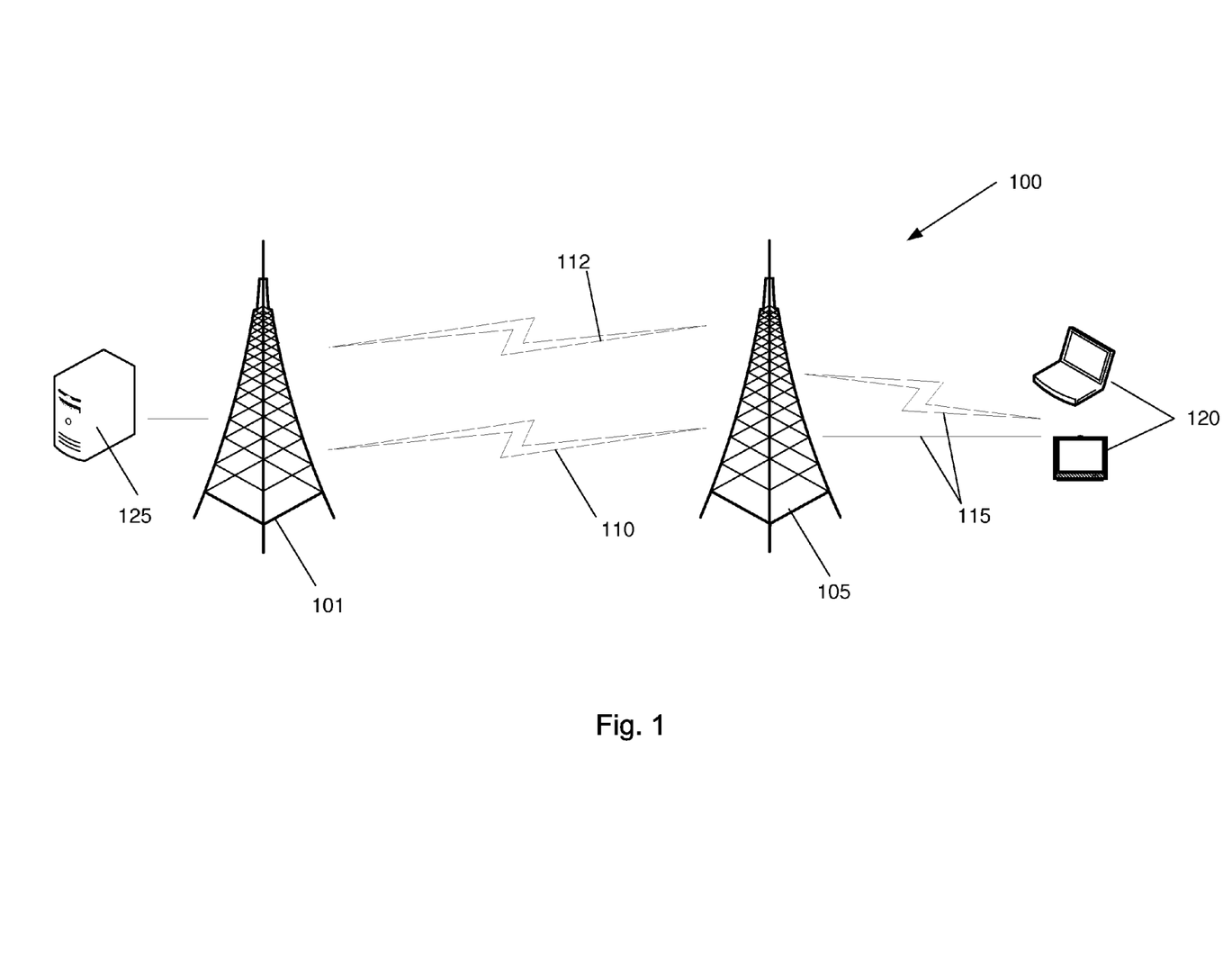
FIG. 1 is a block diagram illustrating a communication system.

FIG. 1 depicts a wireless communication system 100, using technologies such as microwave radio technology. The wireless communication system 100 comprises communication nodes, such as e.g. a first communication node 101 and a second communication node 105. The first communication node 101 may be a transmitting node and the second communication node 105 may be a receiving node, or the first communication node 101 may be a receiving node and the second communication node 105 may be a transmitting node. The nodes 101, 105 may be for example microwave radiolink sites. A third communication node 125 supplies the first communication node 101 with data to be sent to devices 120. A third communication node 125 may for example be a server supplying a video data stream.

The communication nodes 101, 105 communicate with each other via at least two communication links 110, 112. The communication links 110, 112 may be wired or wireless, for example microwave radio links, optical links etc. using any suitable communication protocol. The second communication node 105 may communicate via a communication link 115, wired or wireless, with devices such as a computer or TV 120.

Figure 2A:
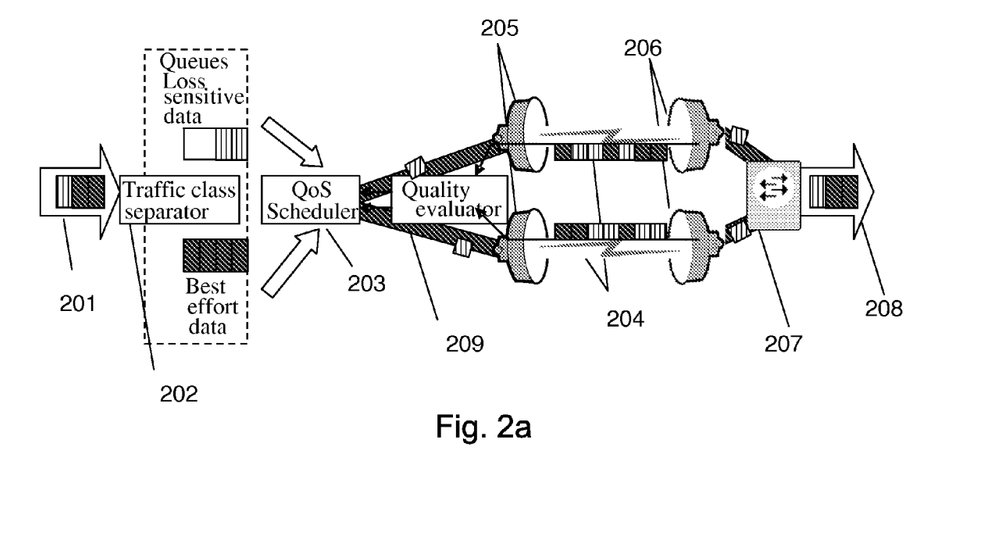
FIGS. 2a and b are block diagrams illustrating embodiments of a method according to the present solution.

FIG. 2a illustrates embodiments of a method according the present solution during normal conditions (i.e. no fading) and FIG. 2b illustrates the same embodiments with fading. During normal conditions, as shown in FIG. 2a, when no fading is present both high priority and loss sensitive traffic and lower priority traffic is sent on both communication links 204 using scheduling and load sharing mechanisms (i.e. inverse multiplexing of data segments or per frame radio selection). The input data traffic is separated 202 to identify the high and low priority traffic classes. The data in the high priority traffic class is placed in one queue, and the data in the low priority traffic class in another queue. The Quality of Service (QoS) scheduler 203 schedules the queues on the communication links 204. The task of the quality evaluator 209 is to evaluate the quality of the communication links 204 by for example collecting real-time quality information and collecting quality statistics of the communication links 204. The quality may be measured continuously, or it may be reported to the quality evaluator 209 or the scheduler 203 when changes in quality occur. The output from the quality evaluator 209 is sent to the scheduler 203 responsible for scheduling and directing data grams and/or data segments to the appropriate communication link 204. As the quality evaluator 209 in FIG. 2a has not reported any fading on the communication links 204, data with high and low priority are sent from the transmitters 205 on both communication links 204. The data are received by receivers 206, and assembled by a transceiver 207 and transmitted further 208. The transceiver 207 is some sort of switch with an egress port. The receiver 206 may also be responsible for evaluating the quality of the received link and transporting it to the transmitter 205 (and the quality evaluator 209).

Figure 2B:
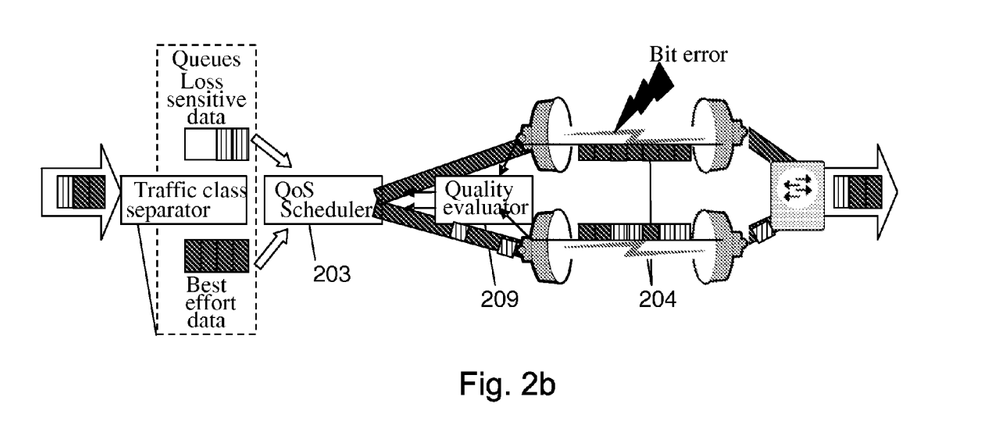

In the case shown in FIG. 2b where one communication link 204 suddenly starts suffer from fading (bit error) the quality feedback is received by the quality evaluator 209 which sends an indication to the scheduler 203 to disregard that signal for loss sensitive, high priority data. The scheduler 203 acts accordingly and redirects loss sensitive, high-priority data to the queue for the other communication link 204 but lower priority data is sent on both links 204. The solution disclosed in FIGS. 2a and 2b have the advantage of simplicity. The mechanism may to a large extent be implemented in current modems and radios by means of FPGA or software updates.

As understood by a person skilled in the art, the communication link comprises a modem (not shown). The modem converts data from a "raw" data form into the applicable media. This means that the modem is closely connected to the communication channel and that one per link is required. In a case where the data may be transmitted in a "raw" form, a modem is not needed.

Figure 3A:
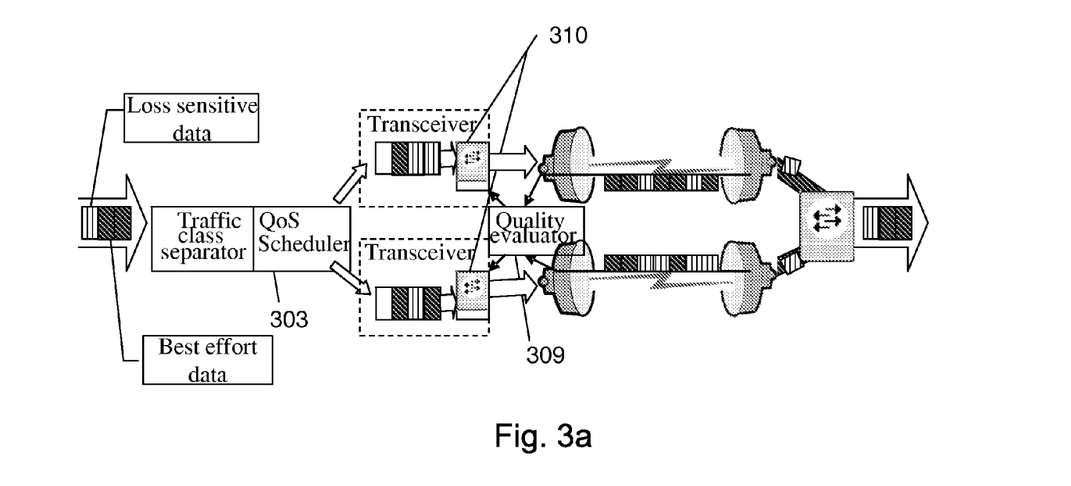
FIGS. 3a and 3b are block diagrams illustrating alternative embodiments of a method according to the present solution.
Figure 3B:
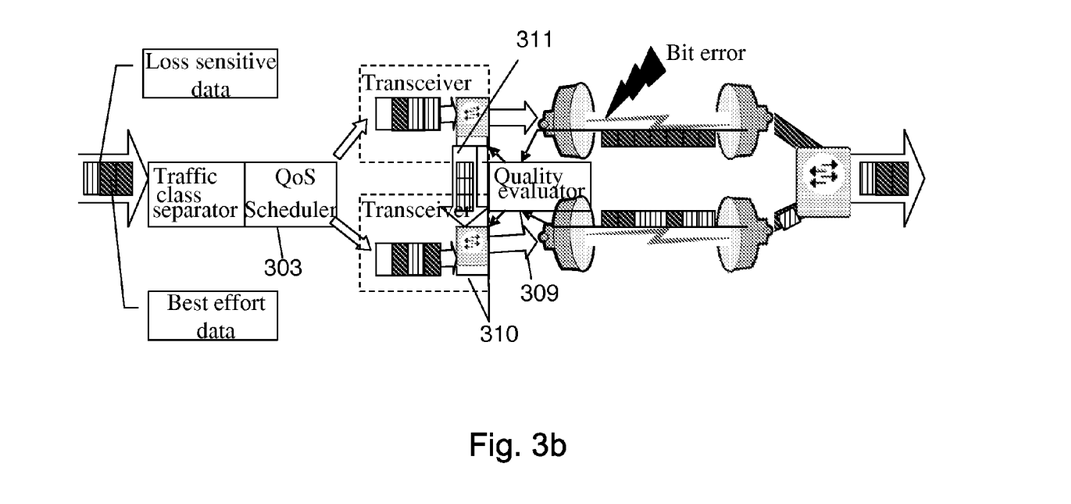

FIG. 3a illustrates alternative embodiments of a method according the present solution during normal conditions (i.e. no fading) and FIG. 3b illustrates the same embodiments with fading. In this alternative there is a connection 311 between two transceivers 310 after their respective buffering stage. The scheduler 303 indicates every loss sensitive datagram with a special flag that may be detected by the transceiver 310 when transmitting. In case of fading, as in FIG. 3b, the quality evaluator 309 sends a signal to the transceivers 310 triggering the loss sensitive data grams to be sent directly to the other transceiver 310. The other transceiver 310 will then stall the normal buffer extraction in case of a transferred loss sensitive datagram is received. In case that the datagram that was just bypassed did not have a loss-sensitive flag, the data in the two buffers may be exchanged with each other. The result is that the loss sensitive data ends up on the communication link with the best reported quality. An advantage of the solution depicted in FIGS. 3a and 3b is that by rerouting each applicable datagram after the modem buffer stage, the response time to fading may be made very fast.

Figure 4A:
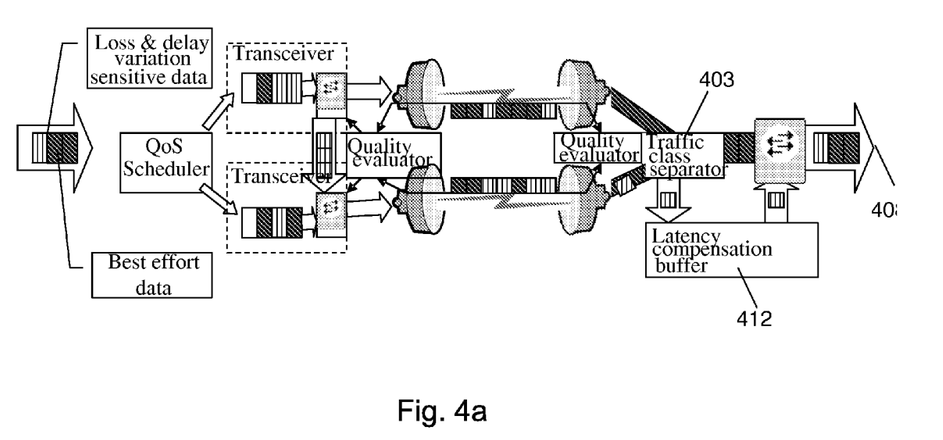
FIGS. 4a and 4b are block diagrams illustrating further alternative embodiments of a method according to the present solution.
Figure 4B:
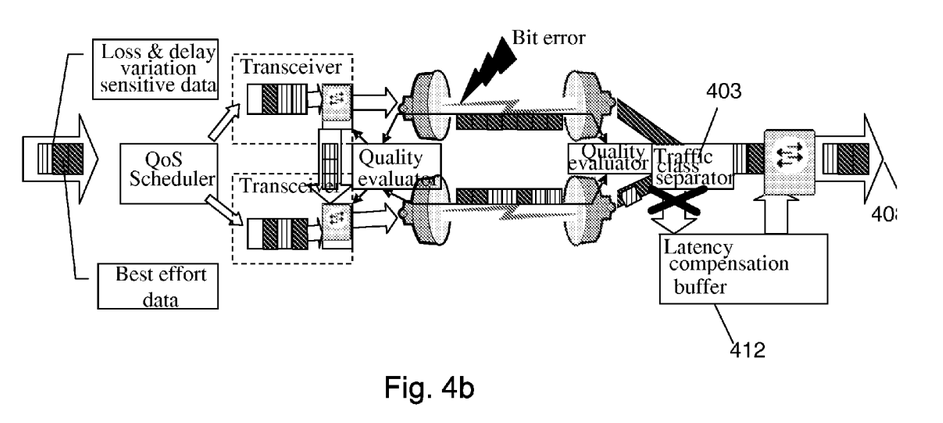

FIG. 4a illustrates further alternative embodiments of the present solution during normal conditions (no fading) and FIG. 4b illustrates the embodiments with fading. Compared to the embodiments shown in FIGS. 2 and 3, the embodiments illustrated in FIGS. 4a and 4b include in addition a buffer 412 for delay compensation in order to provide constant delay for loss and jitter sensitive data.

The latency compensation buffer 412 delays incoming loss and delay sensitive data when during full communication link capacity. When the links are impaired and the link speed for the high priority data is reduced due to the rerouting to the error free link, the latency compensation buffer 412 will adjust the latency of the buffer 412 to zero. This means that the traffic class separator 403 on the receiving side will send the data directly to the egress port 408. This provides the advantage that the delay variation caused by the difference in bandwidth may be compensated in order to provide low Packet Delay Variation (PDV) for highly jitter sensitive data.

The traffic separator 403 is shown as a separate unit in FIG. 4 for illustration purposes, however the traffic separation is performed in the transceiver. In practice this means that each transmitter contains a traffic separator and switch functionality. This means that if the transceiver detects that its own output has poor quality it will redirect the loss sensitive traffic to the other transceiver.

The entities shown in FIGS. 3a and b and FIGS. 4a and b that are not explicitly described are corresponding to the entities shown and described in relation to FIGS. 2a and b.

Figure 5:
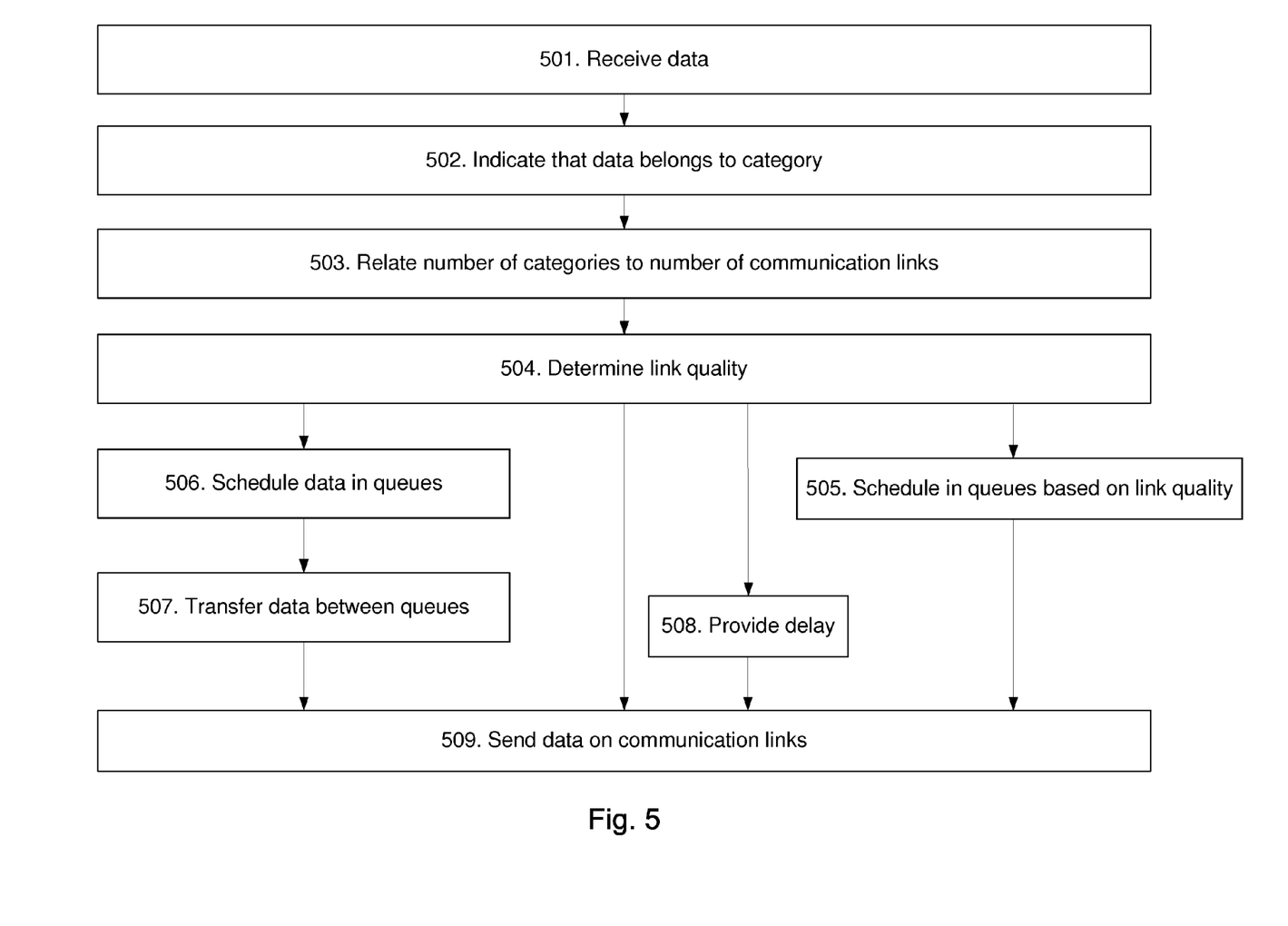
FIG. 5 is a flowchart illustrating embodiments of a method according to the present solution.

The method described above will now be described seen from the perspective of the first communication node 101. FIG. 5 is a flowchart describing the present method in a first communication node 101 for improving bandwidth utilization in a wireless communication system 100. As mentioned above the system comprises at least two communication links 110, 112 between the first communication node 101 and a second communication node 105. The first communication node 101 may be a transmitting node and the second communication node 105 may be a receiving node, or the first communication node 101 may be a receiving node and the second communication node 105 may be a transmitting node. The wireless communication system 100 may be a microwave radio communication system, and the at least two communication links 110, 112 may be microwave radio links.

The method comprises the further steps to be performed in the first communication node 101:

Step 501

The first communication node 101 receives data.

Step 502

The first communication node 101 indicates that the data belongs to a category relating to link quality.

A category may comprise high priority and loss sensitive data.

Step 503

The number of categories is related to the number of communication links.

Step 504

Link quality based on communication link quality measurements of the at least two communication links is determined.

Step 505

This is an optional step. The data from a category may be scheduled in a queue based on the received quality measurements.

Step 506

This is an optional step. The received data may be scheduled in a first queue and a second queue.

Step 507

This is an optional step. The data may be transferred between the first and second queue based on the received quality measurements.

Step 508

This is an optional step. Delay compensation may be provided to data in a category.

Step 509

The first communication node 101 sends the data on one of the at least two communication links 110, 112 to the second communication node 105. The link being chosen based on the received quality measurements.

Figure 6:
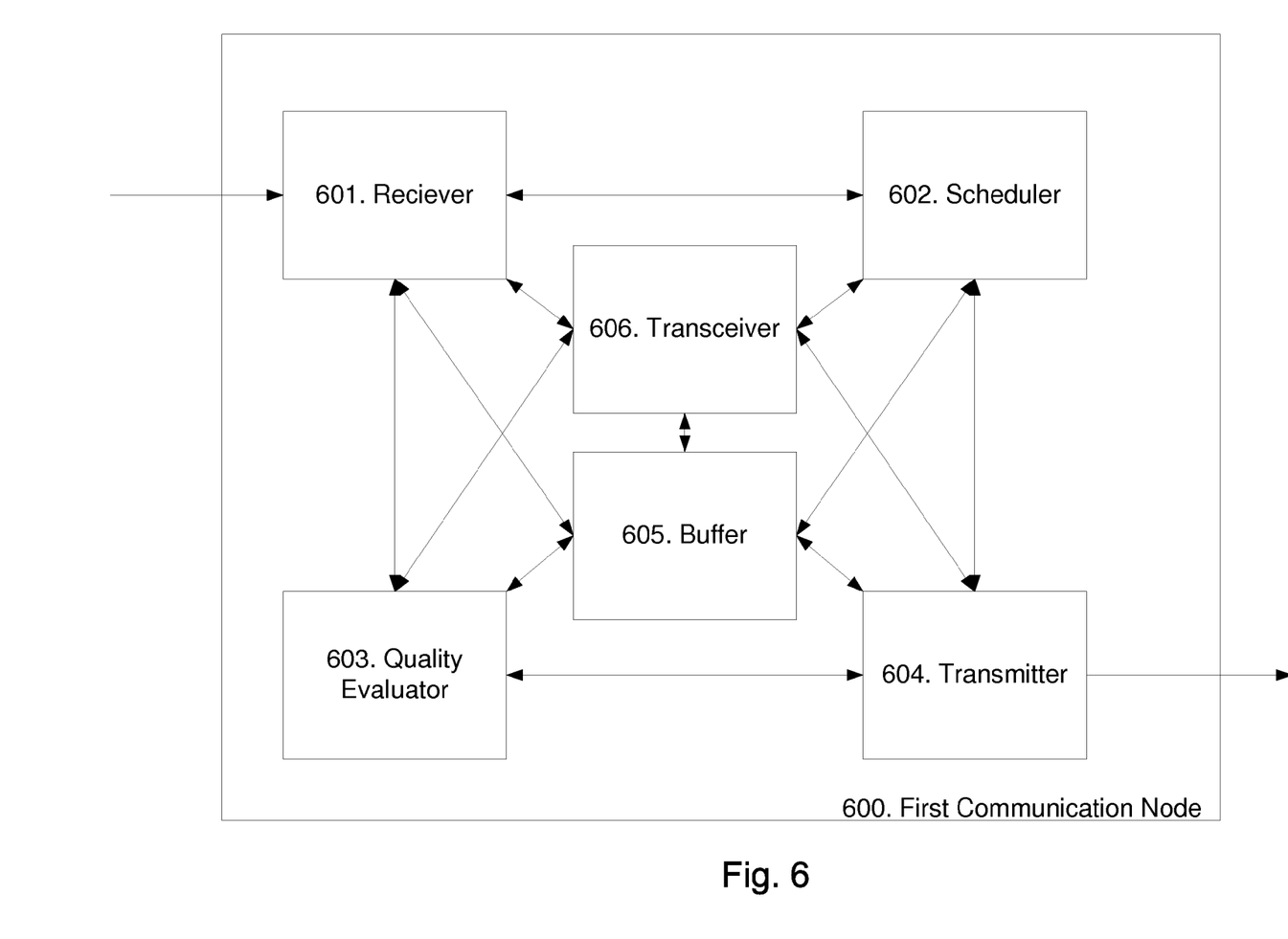
FIG. 6 is a schematic block diagram illustrating embodiments of a communication node.

To perform the method steps shown in FIG. 5 for improving bandwidth utilization in a wireless communication system 100 the first communication node is as shown in FIG. 6. The system 100 comprises at least two communication links 110, 112 between the first communication node 101 and a second communication node 105. The first communication node 101 comprises a receiver 601 arranged to receive data and a scheduler 602 arranged to indicate that the data belongs to a category relating to link quality and arranged to relate the number of categories to the number of communication links. The first node 101 also comprises a quality evaluator 603 arranged to determine link quality based on communication link quality measurements of the at least two communication links 110, 112, and a transmitter 604 arranged to transmit the data on one of the at least two communication links 110, 112 to the second communication node 105. The link being chosen based on the received quality measurements.

The scheduler 602 may be arranged to schedule the data from a category in a queue based on the received quality measurements.

The scheduler 602 may further be arranged to schedule the received data in a first queue and a second queue. The first communication node 101 may further comprise at least one transceiver 606 arranged to transfer the data between the first and second queue based on the received quality measurements.

The first communication node 101 may comprise a buffer 605 arranged to provide delay compensation to data in a category.

The present mechanism for improving bandwidth utilization in a wireless communication network 100 may be implemented through one or more processors together with computer program code on a computer readable medium for performing the functions of the present solution. The program code mentioned above may also be provided as a computer program product, for instance in the form of a data carrier carrying computer program code for performing the present solution when being loaded into the communication node. One such carrier may be in the form of a CD ROM disc. It is however feasible with other data carriers such as a memory stick. The computer program code can furthermore be provided as pure program code on a server and downloaded to the communication node remotely.

The description of the present solution is depicted as simplex communication. However, the mechanisms may be duplicated so that the mechanisms are available for traffic in both directions.

Even if this invention describes a microwave fading scenario, the invention might be applied to other areas where multiple parallel data channels carrying loss sensitive data may be subjected to different bit error rates and/or rapid changes of link speed.

It should be noted that the term "comprises/comprising" when used in this specification is taken to specify the presence of stated features, integers, steps or components, but does not preclude the presence or addition of one or more other features, integers, steps, components or groups thereof. The invention may at least in part be implemented in either software or hardware. It should further be noted that any reference signs do not limit the scope of the claims, and that several "means", "devices", and "units" may be represented by the same item of hardware.

It should also be emphasized that the steps of the methods defined in the appended claims may, without departing from the present invention, be performed in another order than the order in which they appear in the claims.

The above mentioned and described embodiments are only given as examples and should not be limiting to the present invention. Therefore, the above embodiments should not be taken as limiting the scope of the invention, which is defined by the appending claims. Other solutions, uses, objectives, and functions within the scope of the invention as claimed in the below described patent claims should be apparent for the person skilled in the art.

The invention claimed is:

1. A method in a first communication node for improving bandwidth utilization in a wireless communication system, the system comprising at least two communication links between the first communication node and a second communication node, the method comprising the steps of:
   receiving, by the first communication node, data;
   indicating, by the first communication node, that the received data belongs to a category relating to link quality;
   relating, by the first communication node, a number of categories to a number of communication links;
   scheduling, by the first communication node, the received data in a first queue and a second queue, wherein the first queue is on the first link and the second queue is on the second link;
   determining, by the first communication node, whether fading occurs on one of the at least two communication links based on communication link quality measurements of the at least two communication links, wherein the at least two communication links, a first and a second link, are actively sending data at the same time;
   in response to determining that fading occurs on the first link, transferring, by the first communication node, a first portion of the received data from the first queue to the second queue and not transferring a second portion of the received data from the first queue to the second queue, wherein the first portion of the received data has a higher priority level than the second portion of the received data; and
   sending to the second communication node, by the first communication node, the first portion of the received data on the second link and the second portion of the received data on the first link.

2. The method according to claim 1, further comprising the steps of:
   scheduling the data from a category in a queue based on the received quality measurements.

3. The method according to claim 1, further comprising the steps of:
   providing delay compensation to data in a category.

4. The method according to claim 1,
   wherein the first communication node is a transmitting node and the second communication node is a receiving node, or wherein the first communication node is a receiving node and the second communication node is a transmitting node.

5. The method according to claim 1,
   wherein the wireless communication system is a microwave radio communication system, and the at least two communication links are microwave radio links.

6. The method according to claim 1,
   wherein a category comprises high priority and loss sensitive data.

7. A first communication node in a wireless communication system for improving bandwidth utilization, the system comprising at least two communication links between the first communication node and a second communication node, the first communication node comprising:
   a receiver configured to receive data;
   a processor;
   a non-transitory computer readable medium coupled to the processor, said computer readable medium containing instructions executable by the processor, wherein the processor is configured to:
      indicate that the received data belongs to a category relating to link quality and relate the number of categories to the number of communication links, and schedule the received data in a first queue and a second queue, wherein the first queue is on the first link and the second queue is on the second link, and determine whether fading occurs on one of the at least two communication links based on communication link quality measurements of the at least two communication links, a first and a second link, wherein the at least two communication links are actively sending data at the same time;

at least one transceiver configured to:

transfer the received data between the first queue and second queue based on the quality measurements, and in response to determining that fading occurs on the first link, transfer a first portion of the received data from the first queue to the second queue and not transfer a second portion of the received data from the first queue to the second queue, wherein the first portion of the received data has a higher priority level than the second portion of the received data; and a transmitter configured to send to the second communication node the first portion of the received data on the second link and the second portion of the received data on the first link.

8. The first communication node according to claim 7, wherein the processor is configured to schedule the data from a category in a queue based on the quality measurements.

9. The first communication node according to claim 7, further comprising:

a buffer configured to provide delay compensation to data in a category.

10. The first communication node according to claim 7, wherein the first communication node is a transmitting node and the second communication node is a receiving node, or wherein the first communication node is a receiving node and the second communication node is a transmitting node.

11. The first communication node according to claim 7, wherein the wireless communication system is a microwave radio communication system, and the at least two communication links are microwave radio links.

12. The first communication node according to claim 7, wherein a category comprises high priority and loss sensitive data.

13. A wireless communication system for improving bandwidth utilization, the system comprising at least two communication links between a first communication node and a second communication node, wherein the first communication node is configured to:

receive data;

indicate that the received data belongs to a category relating to link quality;

relate the number of categories to the number of communication links;

schedule the received data in a first queue and a second queue, wherein the first queue is on the first link and the second queue is on the second link;

determine whether fading occurs on one of the at least two communication links based on communication link quality measurements of the at least two communication links, a first link and a second link, wherein the first link and the second link are actively sending data at the same time;

in response to determining that fading occurs on the first link, transfer a first portion of the received data from the first queue to the second queue and not transfer a second portion of the received data from the first queue to the second queue, wherein the first portion of the received data has a higher priority level than the second portion of the received data; and transmit the first portion of the received data on the second link and the second portion of the received data on the first link, and wherein the second communication node is configured to:

receive the transmitted data on the at least two communication links;

assemble the transmitted data; and transmit the assembled data to a receiver.

14. The wireless communication system according to claim 13, wherein the first communication node is further configured to schedule the data from a category based on the quality measurements.

15. The wireless communication system according to claim 13, wherein the second communication node is further configured to provide delay compensation to data in a category.

16. The wireless communication system according to claim 13, wherein the first communication node is a transmitting node and the second communication node is a receiving node, or wherein the first communication node is a receiving node and the second communication node is a transmitting node.

17. The wireless communication system according to claim 13, wherein the wireless communication system is a microwave radio communication system, and the at least two communication links are microwave radio links.

18. The wireless communication system according to claim 13, wherein a category comprises high priority and loss sensitive data.

19. The first communication node according to claim 7, wherein the processor is configured to send a signal to transceivers after fading occurs.

20. The first communication node according to claim 7, wherein other transceivers stall buffer extraction in case a transferred loss sensitive datagram is received.

21. The wireless communication system of claim 13, wherein the at least two communication links are microwave radio links used in parallel.

22. The method of claim 1, wherein the transferring the data between the first queue and the second queue includes a latency compensation buffer adjusting latency of a buffer to zero based on a link speed for the data being reduced due to the data being rerouted to an error free link.

23. The method of claim 1, wherein the one of the at least two communication links includes a traffic separator sending the data to an egress port, wherein sending the data to the egress port compensates for a difference in bandwidth.

24. The method of claim 1, further comprises sending low priority data of the received data on both of the two communication links to the second communication node at the same that the transferred first portion of the received data is sent on one of the at least two communication links to the second node.

* * * * *

UNITED STATES PATENT AND TRADEMARK OFFICE
CERTIFICATE OF CORRECTION

PATENT NO. : 9,713,034 B2
APPLICATION NO. : 13/505364
DATED : July 18, 2017
INVENTOR(S) : Moller It is certified that error appears in the above-identified patent and that said Letters Patent is hereby corrected as shown below:

In the Drawings

In Fig. 4a, Sheet 4 of 6, delete Tag "40" and insert Tag -- 408 --, therefor.

In Fig. 4b, Sheet 4 of 6, delete Tag "40" and insert Tag -- 408 --, therefor.

In Fig. 6, Sheet 6 of 6, delete Tag "600." and insert Tag -- 101. --, therefor.

In the Specification

In Column 6, Line 57, delete "is as shown" and insert -- is shown --, therefor.

In the Claims

In Column 10, Line 60, in Claim 24, delete "same that" and insert -- same time --, therefor.

Signed and Sealed this
Twentieth Day of March, 2018

Andrei Iancu
*Director of the United States Patent and Trademark Office*